United States Patent
Mizuguchi

(10) Patent No.: US 8,825,039 B2
(45) Date of Patent: Sep. 2, 2014

(54) MOBILE TELEPHONE DEVICE, CONTROL METHOD THEREOF AND NON-TRANSITORY COMPUTER-READABLE MEDIUM

(75) Inventor: Ryo Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1253 days.

(21) Appl. No.: 12/233,326

(22) Filed: Sep. 18, 2008

(65) Prior Publication Data

US 2009/0029695 A1 Jan. 29, 2009

Related U.S. Application Data

(63) Continuation of application No. PCT/JP2006/305510, filed on Mar. 20, 2006.

(51) Int. Cl.
- *H04W 4/00* (2009.01)
- *H04M 15/00* (2006.01)
- *H04M 1/2745* (2006.01)
- *H04M 15/16* (2006.01)
- *H04M 3/42* (2006.01)

(52) U.S. Cl.
CPC .......... *H04M 15/16* (2013.01); *H04M 15/8351* (2013.01); *H04M 1/2745* (2013.01); *H04M 1/274508* (2013.01); *H04M 2215/8108* (2013.01); *H04M 2250/66* (2013.01); *H04M 3/42289* (2013.01)
USPC ..................... 455/422.1; 455/432.1; 455/415; 455/412.1; 455/418; 455/414.4

(58) Field of Classification Search
CPC ......... H04W 4/00; H04W 4/02; H04W 88/02; H04W 88/06
USPC .............. 455/422.1, 406, 432, 405, 407, 433, 455/432.1, 414.4, 418, 415, 412.1; 379/221.13, 210.02, 215.01
See application file for complete search history.

(56) References Cited

U.S. PATENT DOCUMENTS 6,526,272 B1 * 2/2003 Bansal et al. ................. 455/406
6,570,973 B1 * 5/2003 Boughman et al. ...... 379/207.02
(Continued)

FOREIGN PATENT DOCUMENTS

| JP | 2001036641 A | 2/2001 |
| JP | 2001094656 A | 4/2001 |

(Continued)

OTHER PUBLICATIONS

International Search Report of PCT/JP2006/305510, date of mailing May 30, 2006.

(Continued)

*Primary Examiner* — Michael T Vu
(74) *Attorney, Agent, or Firm* — Westerman, Hattori, Daniels & Adrian, LLP

(57) ABSTRACT

Call control of a mobile telephone device and so on used for a plurality of carriers (telephone lines) is provided for acquisition of carrier information and notification thereof to improve serviceability, wherein carrier information of a call destination is stored, carrier information is exchanged during the telephone call, and, when notified carrier information is different from stored carrier information, which is notified or a connection is suppressed. In addition, when a carrier of a call destination is not a specific carrier, after which is notified and carrier information of the call destination is also notified to an outgoing call side, a connection with the call destination is initiated at a request from the outgoing call side.

12 Claims, 18 Drawing Sheets

(56) References Cited

U.S. PATENT DOCUMENTS

| | | | |
|---|---|---|---|
| 6,807,433 B2* | 10/2004 | Oota et al. | 455/566 |
| 7,599,887 B1* | 10/2009 | Short | 705/41 |
| 2005/0032512 A1* | 2/2005 | Qi et al. | 455/422.1 |
| 2007/0111714 A1* | 5/2007 | Edwards | 455/415 |

FOREIGN PATENT DOCUMENTS

| | | | |
|---|---|---|---|
| JP | 2003069691 A | 3/2003 |
| JP | 2004080367 A | 3/2004 |
| JP | 2004140621 A | 5/2004 |

OTHER PUBLICATIONS

Notification of Transmittal of Translation of the International Preliminary Report on Patentability (Form PCT/IB/338) of International Application No. PCT/JP2006/305510 mailed Oct. 30, 2008 with Forms PCT/IB/373 and PCT/ISA/237.

* cited by examiner

MOBILE TELEPHONE DEVICE, CONTROL METHOD THEREOF AND NON-TRANSITORY COMPUTER-READABLE MEDIUM

CROSS-REFERENCE TO RELATED APPLICATIONS

This application is a continuation of International Application No. PCT/JP2006/305510, filed on Mar. 20, 2006, now pending, herein incorporated by reference.

BACKGROUND OF THE INVENTION

1. Field of the Invention

The present invention relates to acquisition of telephone line (carrier) information and to call control. Specifically, the present invention relates to a mobile telephone device that uses acquired carrier information of an opposite destination for call control, a communication server apparatus, a control method thereof, a control program and a recording medium.

2. Description of the Related Art

In a mobile telephone device, a telephone line (carrier) used by a mobile telephone device of the other end of the line can be surmised from a telephone number of the opposite destination. Or in a mobile telephone device, it is known as mechanism of outgoing call restriction corresponding to a telephone line to restrict international roaming, an out of town call, a cap of telephone call rates, an outgoing call except a station-to-station call, etc. By utilizing them, a connection not intended by a user can be prevented at an outgoing caller side.

Concerning a telephone line, in Japanese Patent Application Laid-open Publication No. 2001-36641 (paragraph No. 0036, FIG. 1, etc.), a technique on a public telephone network and an exchanger thereof is disclosed, for example; a database storing information whether an outgoing caller and an incoming caller subscribe to an internet service, a kind of a telephone, etc. is accessed, and whether an internet communication network or the public telephone network is passed is selected by subscriber information obtained from the database on the basis of a telephone number of the incoming caller that is dialed by the outgoing caller.

By registration of a telephone number of a specific the other end, a carrier provides services such as call rates and discount for the telephone number. When a carrier of a connection destination is different from a carrier of an outgoing caller side, the case may occur that conditions set by the carrier are different so that out of discount, decrease of discount, etc. occur.

On the basis of such condition, a user inquires a used carrier from a call destination, searches a carrier from a telephone number, certifies by a carrier in advance whether a specific service can be received and registers information on the carrier with the telephone number. Such operation is troublesome for a user who has many connection destinations.

Because of introduction of Number Portability which allows mobile phone users to continue to use the same telephone number even after changing carriers, it is assumed that even if a telephone number is the same, a carrier except a carrier assumed from the telephone number executes a call connection. Therefore, a user may not receive a service with an expecting condition of a carrier.

According to such problems, there is no disclosure or suggestion in Japanese Patent Application Laid-open Publication No. 2001-36641, and there is no disclosure or suggestion about structure and so on to solve the same.

SUMMARY OF THE INVENTION

An object of the present invention relates to a mobile telephone device used for a plurality of carriers (telephone lines) and is to improve serviceability by acquisition of carrier information and notification thereof.

Another object of the present invention relates to a mobile telephone device used for a plurality of lines and is to enable call control by notification of carrier information.

The present invention relates to a mobile telephone device comprising structure that by storing carrier information of a call destination and transmitting and receiving carrier information in a call, if notified carrier information is different from the stored carrier information, which is notified or a connection is stopped. From the structure, the objects described above can be achieved.

The present invention relates to a communication server apparatus intervening between the mobile telephone devices, comprising structure that if a carrier of a call destination is not a specific carrier, which is notified to an outgoing call side and carrier information of the carrier is notified thereto, after that, a connection with the call destination is made to start by a request from the outgoing call side. From such structure, the objects described above can be achieved.

To achieve the above objects, according to a first aspect of the present invention there is provided a mobile telephone device comprising: a storage part that stores carrier information of a call destination; a determination part that determines in a call whether carrier information notified from the call destination coincides with carrier information which exists in the storage part; and a notification part that notifies the determination if the determination part determines that the carrier information notified from the call destination is different from the carrier information in the storage part. In the first aspect, carrier information is transmitted and received between mobile telephone devices making a call. By notification of the carrier information, a user can determine whether a call is made.

In the above mobile telephone device, preferably, the notification part may comprise a display part displaying the carrier information notified from the call destination.

Preferably, the above mobile telephone device may comprise a call deterrence part that suppresses a call if the carrier information notified from the call destination is different from the carrier information in the storage part.

Preferably, the above mobile telephone device may comprise a storing control part that writes the carrier information notified from the call destination into the storage part or updates the storage part by a connection with the call destination.

To achieve the above objects, according to a second aspect of the present invention there is provided a control method of a mobile telephone device comprising: storing carrier information of a call destination in a storage part; determining in a call whether carrier information notified from the call destination coincides with carrier information which exists in the storage part; and notifying the determination if it is determined that the carrier information notified from the call destination is different from the carrier information in the storage part. From such structure, the above objects can be achieved.

Preferably, the above control method of a mobile telephone device may comprising: displaying the carrier information notified from the call destination on a display part.

Preferably, the above control method of a mobile telephone device may comprise: suppressing a call if the carrier information notified from the call destination is different from the carrier information in the storage part.

Preferably, the above control method of a mobile telephone device may comprise: writing the carrier information notified from the call destination into the storage part or updating the storage part by a connection with the call destination.

To achieve the above objects, according to a third aspect of the present invention there is provided a computer-readable recording medium storing a control program of a mobile telephone device, the program comprising the steps of: storing carrier information of a call destination in a storing part; determining in a call whether carrier information notified from the call destination coincides with carrier information which exists in the storage part in a call; and notifying the determination if it is determined that the carrier information notified from the call destination is different from the carrier information in the storage part. From such structure, the above objects can be achieved.

In the above recording medium, preferably, the program may comprise the step of displaying the carrier information notified from the call destination on a display part.

In the above recording medium, preferably, the program may comprise the step of suppressing a call if the carrier information notified from the call destination is different from the carrier information in the storage part.

In the above recording medium, preferably the program may comprise the step of writing the carrier information notified from the call destination into the storage part or updating the storage part by a connection with the call destination.

To achieve the above objects, according to a fourth aspect of the present invention there is provided a mobile telephone device comprising: a storage part that stores carrier information; and a notification part that notifies in a call the carrier information existing in the storage part to a call destination. In the aspect, carrier information is notified to an outgoing call side in a call. A change of a carrier and so on can be notified to the other end and call serviceability by the medium of carrier information can be enhanced.

Preferably, the above mobile telephone device may comprise a setting part that sets whether the carrier information is notified to the call destination, wherein the notification part notifies the carrier information or rejects notification of the carrier information by the setting of the setting part.

To achieve the above objects, according to a fifth aspect of the present invention there is provided a communication server apparatus that is connected to a mobile telephone device, comprising: a notification part that specifies a carrier of a receiving side designated by an outgoing call side and notifies carrier information of the receiving side to the outgoing call side. In the aspect, carrier information is provided from the communication server apparatus intervening between the mobile telephone devices, and call serviceability by the medium of a carrier can be enhanced.

preferably, the above communication server apparatus may comprise a connection part that connects the outgoing call side with the receiving side after the notification part notifies the carrier information.

To achieve the above objects, according to a sixth aspect of the present invention there is provided a control method of a mobile telephone device, comprising: storing carrier information in a storage part; and notifying in a call the carrier information existing in the storage part to a call destination. From such structure, the above objects can be achieved.

Preferably, the above control method of a mobile telephone device may comprise: setting whether the carrier information is notified to the call destination; and notifying the carrier information or rejecting notification of the carrier information by the setting.

To achieve the above objects, according to a seventh aspect of the present invention there is provided a control method of a communication server apparatus connected to a mobile telephone device, the method comprising: specifying a carrier of a receiving side designated by an outgoing call side and notifying carrier information of the receiving side to the outgoing call side. From such structure, the above objects can be achieved.

Preferably, the above control method of a communication server apparatus may comprise: connecting the outgoing call side with the receiving side after notification of the carrier information.

To achieve the above objects, according to an eighth aspect of the present invention there is provided a computer-readable recording medium storing a control program of a mobile telephone device, the program comprising the steps of: storing carrier information in a storage part; and notifying in a call the carrier information existing in the storage part to a call destination. From such structure, the above objects can be achieved.

In the above recording medium, preferably the program may comprise the steps of: setting whether the carrier information is notified to the call destination; and notifying the carrier information or rejecting notification of the carrier information by the setting.

To achieve the above objects, according to a ninth aspect of the present invention there is provided a computer-readable recording medium storing a control program of a communication server apparatus connected to a mobile telephone device, the program comprising the step of: specifying a carrier of a receiving side designated by an outgoing call side and notifying carrier information of the receiving side to the outgoing call side. From such structure, the above objects can be achieved In the above recording medium, preferably the program may comprise the step of: connecting the outgoing call side with the receiving side after notification of the carrier information.

The features and advantages of the present invention are as follows.

(1) Concerning a mobile telephone device used for a plurality of lines (carriers), carrier information of a call destination can be obtained at an outgoing call side, a call can be made according to a carrier of the outgoing call side or an opposite destination, and convenience thereof can be enhanced.

(2) A call can be controlled like connection deterrence according to notified carrier information. Thus, convenience of a call can be enhanced.

(3) By notification of carrier information, a service set by each carrier can be received. For example, when a service of discount call rates is used, it can be known that whether a call applies to discount in starting the call even if a call opposition uses Number Portability and changes one's carrier to another one with the same telephone number. Thus, convenience of a call by the medium of a carrier, for example by preventing increase of call rates for a call out of discount with no intension, can be enhanced.

Other objects, features and advantages of the present invention will be more clear by referring to the accompanying drawings and each embodiment.

DETAILED DESCRIPTION OF THE PREFERRED EMBODIMENTS

First Embodiment

Figure 1:
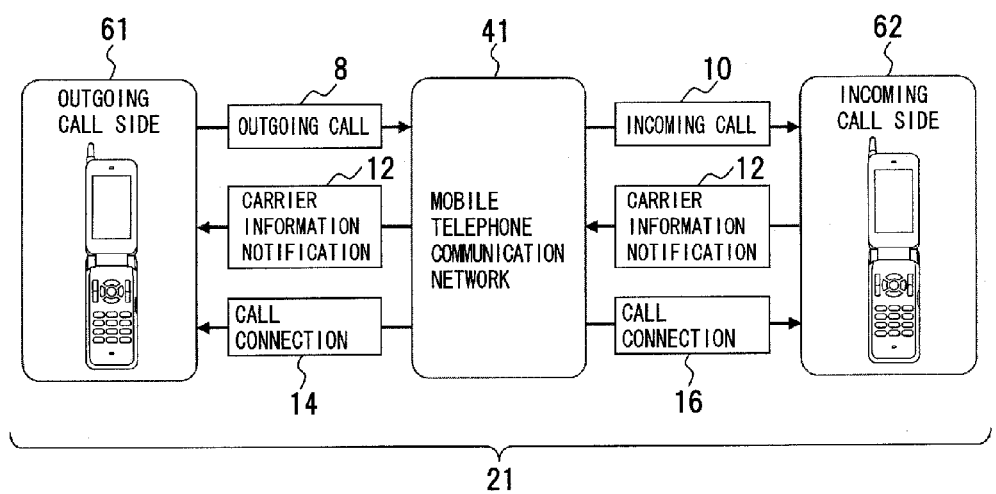
FIG. 1 depicts a call control system according to a first embodiment.
Figure 2:
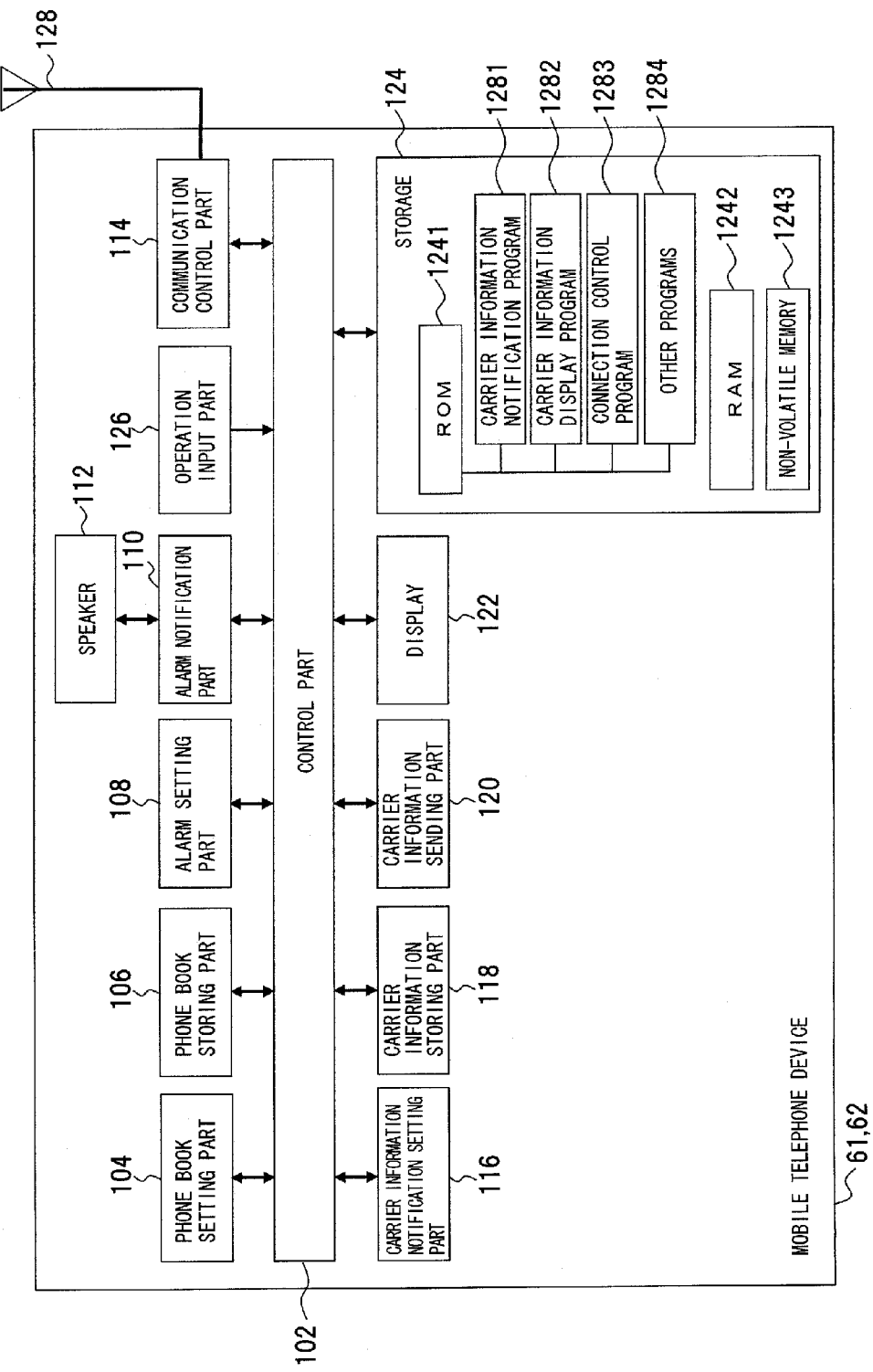
FIG. 2 depicts structure of a mobile telephone device.
Figure 3:
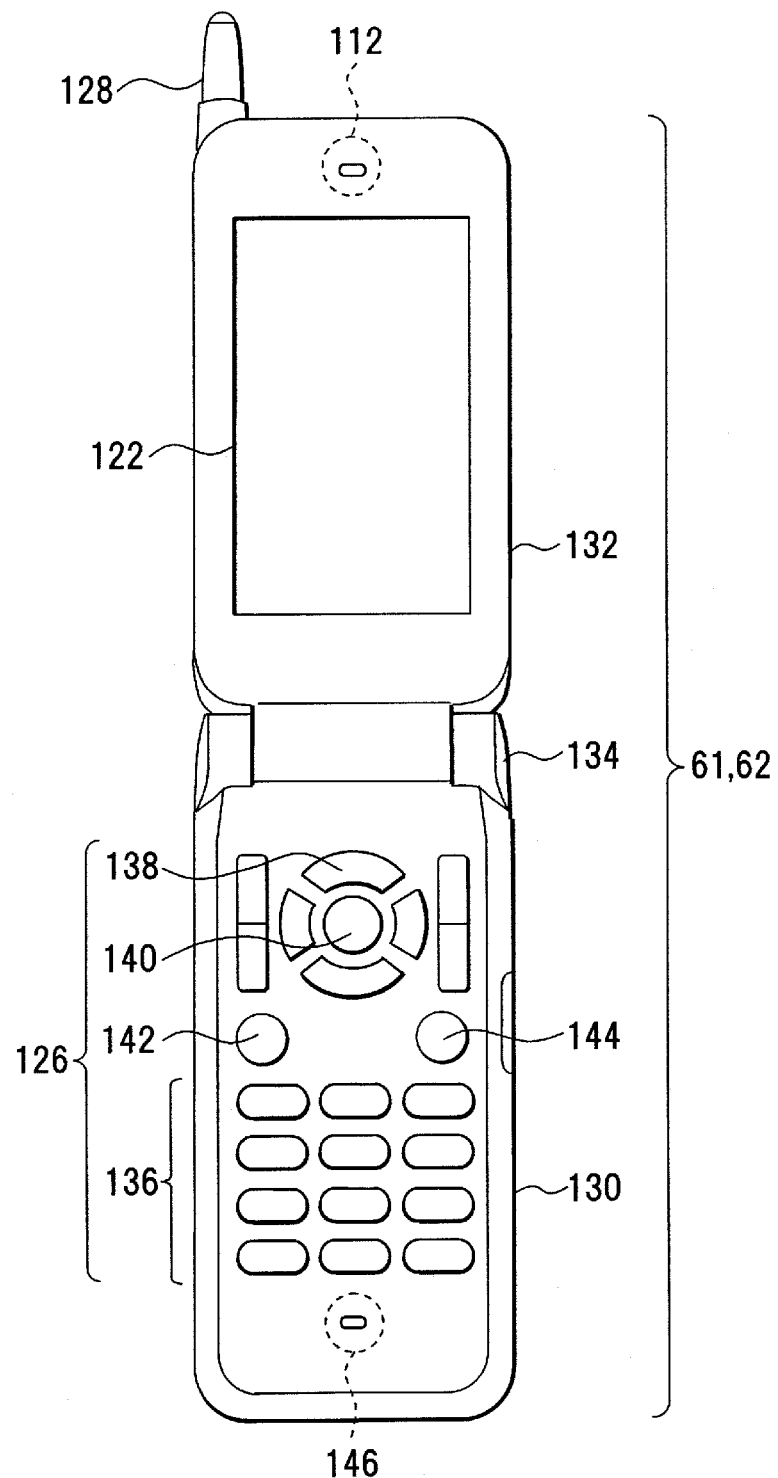
FIG. 3 depicts structure of an aspect unit of a mobile telephone device.

A first embodiment of the present invention will be described with reference to FIGS. 1, 2 and 3. FIG. 1 depicts a call control system according to a first embodiment, FIG. 2 depicts structure of a mobile telephone device and FIG. 3 depicts structure of an aspect unit of the mobile telephone device.

In a call control system 21 of the first embodiment, about mobile telephone devices 61 and 62 which are mediated through a mobile telephone communication network 41 as a communication server apparatus, by notification of carrier information, in case that the notified carrier information is different from registered carrier information, notification thereof and/or control of connection deterrence are executed. Here, the mobile telephone communication network 41 is all of communication line networks provided by a lot of telecommunication companies. Carrier information is information representative of a communication line provided by a telecommunication company.

In the call control system 21, as shown in FIG. 1, an outgoing call 8 of the mobile telephone device 61 at an outgoing call side is received by the mobile telephone communication network 41, and the mobile telephone device 62 of an incoming call side (the other end of the line) receives an incoming call 10 from the mobile telephone communication network 41. With this occasion, after carrier information notification 12 sent from the mobile telephone device 62 is transferred to the mobile telephone device 61 via the mobile telephone communication network 41, call connections 14 and 16 are executed.

Carrier information of the other end of the line is registered in the mobile telephone device 61. If notified carrier information is different from carrier information of the other end of the line that is registered in the mobile telephone device 61, notification to the mobile telephone device 61 side that carrier information is different and/or deterrence of connection to the mobile telephone device 62 is executed. The notification of different carrier information is executed by, for example, screen display or an alarm. The notification and connection deterrence can be changed by setting at the mobile telephone device 61 side.

In such call control system 21, as shown in FIG. 2, the mobile telephone devices 61 and 62 include, for example, a control part 102, and, as various function units, a phone book setting part 104, a phone book storing part 106, an alarm setting part 108, an alarm notification part 110, a speaker 112, a communication control part 114, a carrier information notification setting part 116, a carrier information storing part 118, a carrier information sending part 120, a display 122, a storage 124, an operation input part 126, etc.

The control part 102 is configured by a CPU (Central Processing Unit) and soon, and controls various function parts such as the phone book setting part 104 by executing a program stored in the storage 124. The control part 102 is also a determination part determining whether carrier information notified from a call destination coincides with carrier information in the carrier information storing part 118 by comparison of the both, and executes control based on the determination.

The phone book setting part 104 sets information on the other end of the line such as a name, a telephone number and a mail address by input of the operation input part 126 on the basis of control of the control part 102. The phone book storing part 106 is configured, for example, by a non-volatile memory, and stores information on the other end of the line set in the phone book setting part 104 by control of the control part 102.

The alarm setting part 108 sets whether an alarm is generated or not by control of the control part 102. The alarm notification part 110 is a notification part notifying an alarm about carrier information, and outputs an alarm signal given from the control part 102. The speaker 112 converts the alarm signal into a voice.

The communication control part 114 is controlled by the control part 102, includes an antenna 128, sends a wireless signal to the mobile telephone communication network 41, and receives the wireless signal form the mobile telephone communication network 41. The communication control part 114 sends a call signal and a packet data signal superimposed on a carrier wave as a wireless signal, and reproduces the call signal and the packet data signal from the received wireless signal. The communication control part 114 also configures a call deterrence part because of call deterrence operation thereof.

The carrier information notification setting part 116 is controlled by the control part 102, and sets carrier information to be notified to the other end of the line. The carrier information storing part 118 is a storage storing carrier information, is configured, for example, by a non-volatile memory, and stores carrier information set in the carrier information notification setting part 116 by control of the control part 102. In this case, the carrier information storing part 118 and the phone book storing part 106 are related correspondingly by the other end of the line, and for example, a registration table in correspondence relationship is included. That is, the carrier information storing part 118 and the phone book storing part 106 are in relationship that if the other end of the line is determined, a telephone number and mail address are read out from the phone book storing part 106 and carrier information is read out from the carrier information storing part 118. Then, it may be structured that the carrier information storing part 118 is united with the phone book storing part 106, and carrier information is stored by a telephone number.

The carrier information sending part 120 is a notification part notifying carrier information to a call destination, is controlled by the control part 102, reads out from the carrier information storing part 118 carrier information to be sent when a call is incoming, and notifies the carrier information to the communication control part 114. The display 122 is a notification part notifying carrier information and information on the carrier information, is configured, for example, by an LCD (Liquid Crystal Display), is controlled by the control part 102 and displays carrier information and so on that are outputted from the carrier information sending part 120.

The storage 124 is configured by a ROM (Read-Only Memory) 1241, a RAM (Random-Access Memory) 1242, a non-volatile memory 1243, etc. The ROM 1241 stores a carrier information notification program 1281, a carrier information display program 1282, a connection control program 1283 and other programs 1284. The RAM 1242 configures a working area. In the embodiment, the phone book storing part 106 and the carrier information storing part 118 are configured separately from the storage 124. It may be configured that the phone book storing part 106 and the carrier information storing part 118 are united to the non-volatile memory 1243 in the storage 124, or are stored in a portable recording medium such as a SIM (Subscriber Identity Module) card to be attachable and detachable to the mobile telephone devices 61 and 62.

The operation input part 126 is configured by a keyboard and so on used for information input to the control part 102, and includes symbol keys such as numerals and characters, cursor keys for operating a cursor displayed on the display 122 and a decision key corresponding to a message of a dialog display screen.

In the mobile telephone devices 61 and 62, first and second housings 130 and 132 are linked by a hinge part 134 to be openable and closable as shown in FIG. 3. In the housing 130, symbol keys 136, cursor keys 138, a decision key 140, a connection start key 142, an end key 144 of the operation input part 126, and a microphone 146, etc. are installed. In the housing 132, the display 122, the speaker 112 and the antenna 128, etc. are installed.

Figure 4:
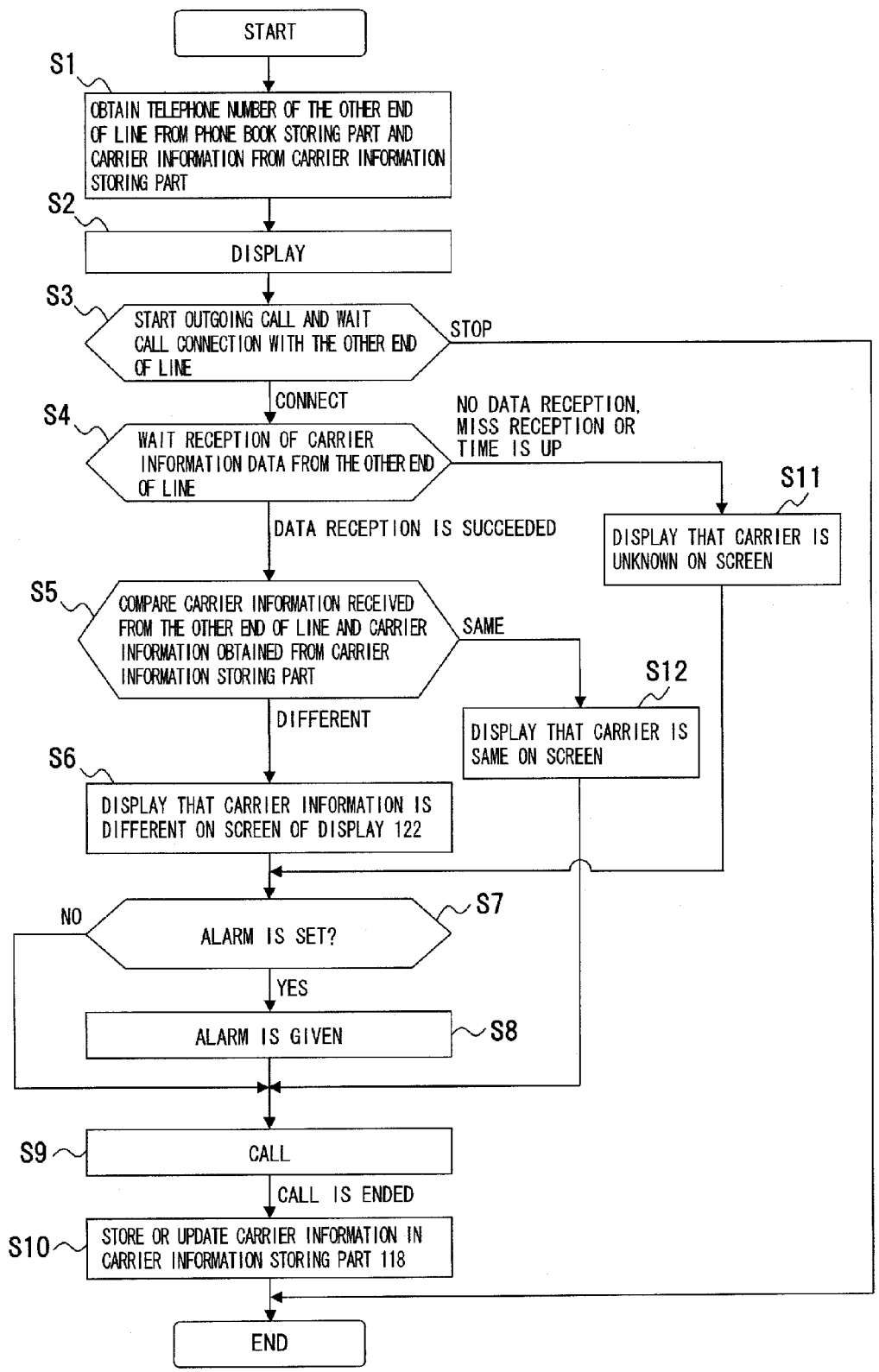
FIG. 4 is a flowchart showing processing procedure of a mobile telephone device at an outgoing call side.

A process of the mobile telephone device 61 at an outgoing call side in the call control system 21 will be described with reference to FIG. 4. FIG. 4 is a flowchart showing processing procedure of the mobile telephone device 61 at an outgoing call side.

In the mobile telephone device 61, a telephone number of the other end of the line and carrier information of a connection destination are set by a user.

Figure 6:
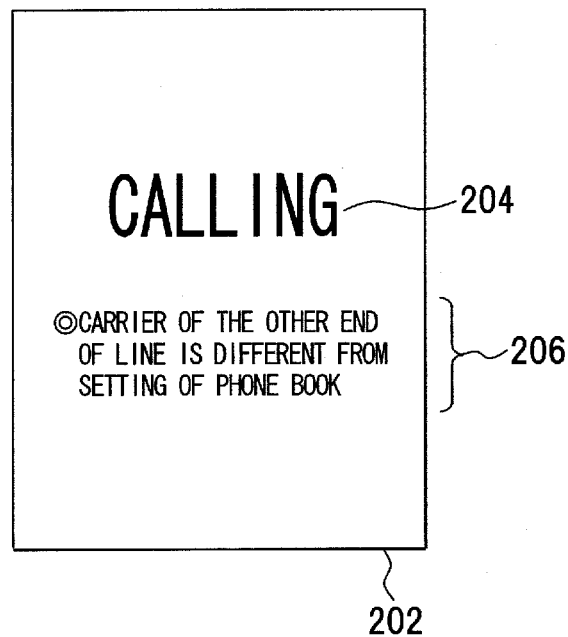
FIG. 6 depicts a message display screen.

To start a call with an opposite destination, the mobile telephone device 61 is started up, a telephone number of the other end of the line is obtained from the phone book storing part 106 and if carrier information exists in the carrier information storing part 118, the carrier information is obtained (step S1). The telephone number and the carrier information are displayed on the display 122 (step S2). An outgoing call is started, a call connection with the other end of the line is waited (step S3), in case of a stop, a call connection process is canceled and in case of a connection, reception of carrier information data from the other end of the line is waited (step S4). If data reception is succeeded, the carrier information received from the other end of the line and the carrier information obtained from the carrier information storing part 118 are compared (step S5) and as a result of the comparison, if the carrier information is different, it is displayed on a screen of the display 122 that the carrier information is different (step S6). In this case, on the screen of the display 122, a message 206 thereabout is displayed as shown in FIG. 6. A user of the mobile telephone device 61 can know that a carrier of the other end of the line is different, from the message 206 in advance of a call.

Whether an alarm is set is determined (step S7), if it is set (YES of step S7), an alarm is given from the speaker 112 (step S8) and it is notified that a carrier of the other end of the line is different by the alarm. A call is made (step S9), if the call is ended, carrier information in the carrier information storing part 118 is updated (step S10) and the process is ended. About the updating of carrier information, if carrier information is not stored in the carrier information storing part 118 first, the process is ended by writing carrier information into the carrier information storing part 118 with a call ended.

Figure 7:
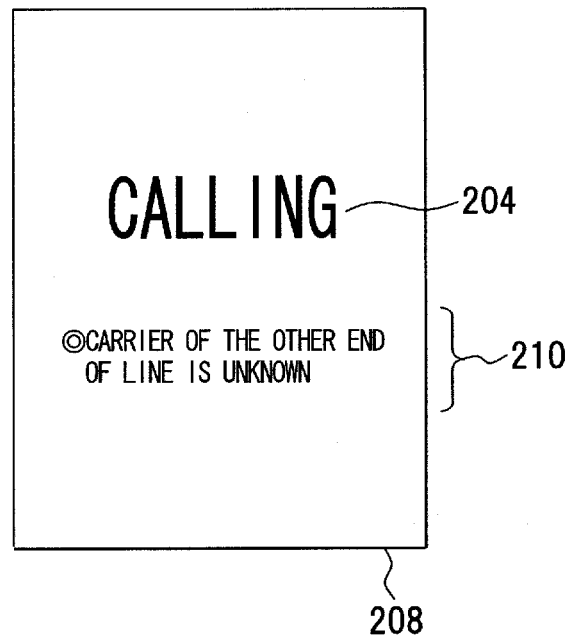
FIG. 7 depicts a message display screen.

In step S4, if carrier information data from the other end of the line is not received thus communication is missed or time for the communication is up, it is displayed on the screen of the display 122 that carrier is unknown (Step S11). In this case, on the display screen of the display 122, as shown in FIG. 7, a message 210 thereabout is displayed and a user of the mobile telephone 61 can know that a carrier of the other end of the line is unknown, from the message 210 in advance of a call.

Figure 8:
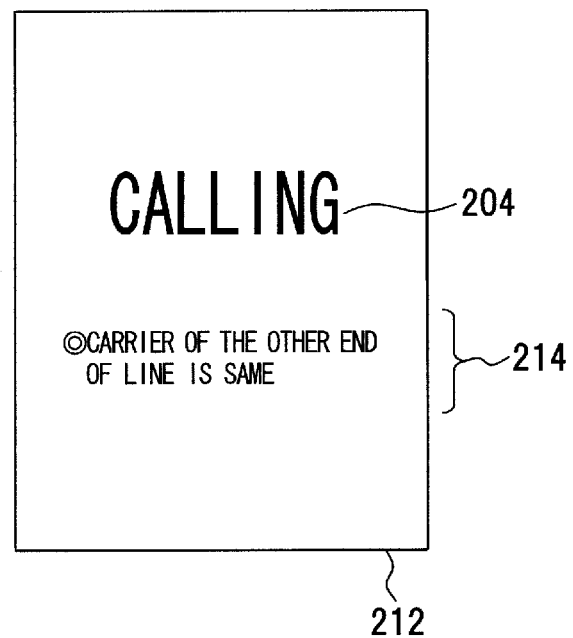
FIG. 8 depicts a message display screen.
Figure 9:
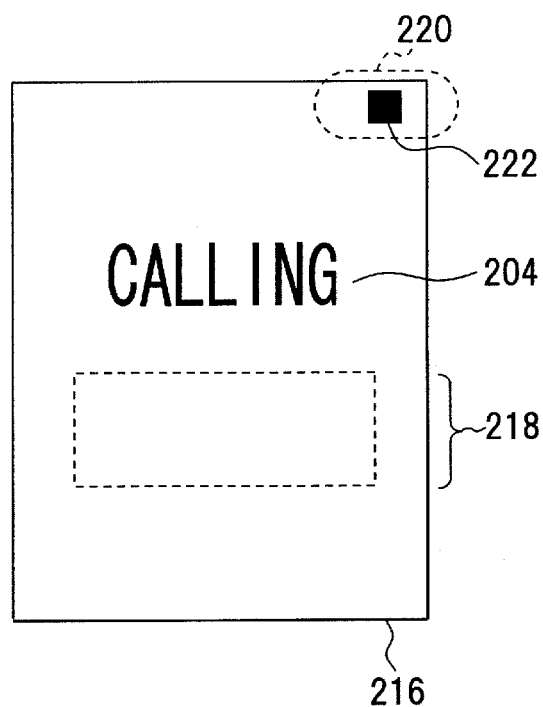
FIG. 9 depicts a message display screen.

In step 5, as a result of the comparison of the carrier information, if the carrier information coincides, it is displayed on the screen of the display 122 that the carrier coincides (step S12). In this case, on the display 122, as shown in FIG. 8, a display screen 212 showing the same carrier is displayed, then as shown in FIG. 9, a display screen 216 of a carrier is displayed. A user of the mobile telephone 61 can know that a carrier of the other end of the line coincides, from a message 214 displayed on the display screen 212, and can know a carrier from a message 218 concerning carrier displayed on the screen display 216 in advance of a call.

If there is no carrier information of the other end of the line in the carrier information storing part 118, carrier information is stored in the carrier information storing part 118 with a call ended.

Figure 5:
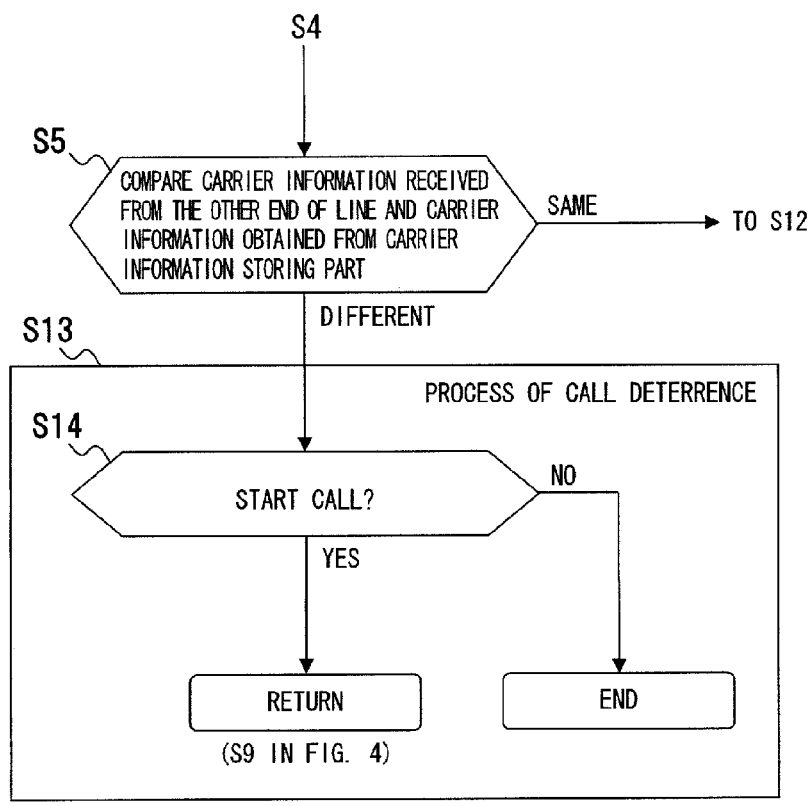
FIG. 5 is a flowchart showing processing procedure of the mobile telephone device at the outgoing call side.

In this case, as shown in FIG. 5, if the carrier information is different as a result of the comparison of the carrier information, it may be processed that a call deterrence process (step S13) is executed and a start of a call is ended.

In this case, in the call deterrence process, a dialog display screen 224 (FIG. 10) is displayed on the display 122, an inquiry whether a call is started or not is executed (step S14), if a call is started, the process returns to step S9 (FIG. 4) and if a call is ended, a call can be ended by pressing the end key 144 of the operation input part 126.

At a start of a call, if a carrier is different, as shown in FIG. 6, a display screen 202 is displayed on the display 122. On the display screen 202, the message 204 representing "calling" and the message 206 concerning a carrier are displayed. In this case, in the message 206, "A carrier of the other end of the line is different from setting of the phone book." is displayed.

If a carrier is unknown, as shown in FIG. 7, a display screen 208 is displayed on the display 122. On the display screen 208, the message 204 representing "calling" and the message 210 concerning a carrier are displayed. In this case, in the message 210, "A carrier of the other end of the line is unknown." is displayed.

If a carrier of a connection destination is the same, as shown in FIG. 8, a display screen 212 is displayed on the display 122. On the display screen 212, the message 204 representing "calling" and the message 214 concerning a carrier are displayed. In this case, in the message 214, "A carrier of the other end of the line is the same." is displayed.

If a carrier of a connection destination is the same, as shown in FIG. 9, a display screen 216 is displayed on the display 122. On the display screen 216, the message 204 representing "calling" and the message 218 concerning a carrier are displayed. In this case, in the message 218, information representing a carrier is displayed. And in this case, in a pict area 220, an icon 222 representing calling is displayed.

Figure 10:
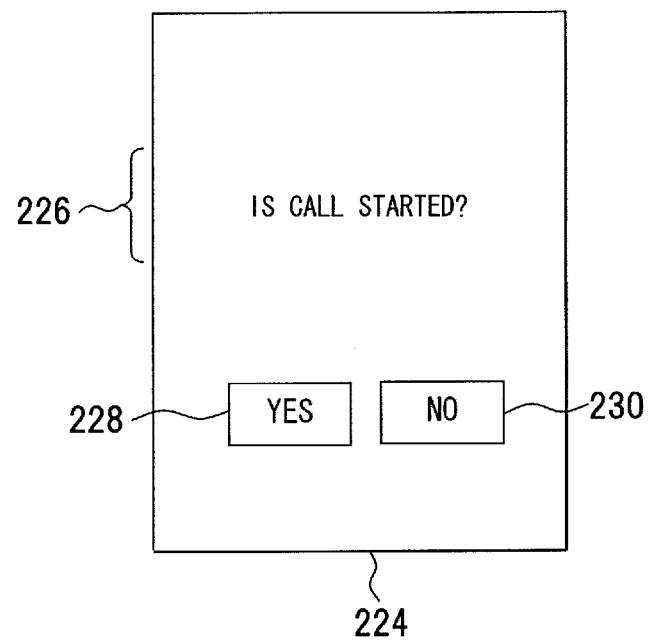
FIG. 10 depicts a dialog display screen.

On a dialog display screen 224, as shown in FIG. 10, a message 226 inquiring a call is displayed, and buttons 228 and 230 representing "YES" and "NO" respectively are displayed. In this case, the message 226, for example, displays "Is a call started?". As a response of the dialog, by assigning the end key 144 to the button 230 for example, a call can be ended with a press of the end key 144.

Figure 11:
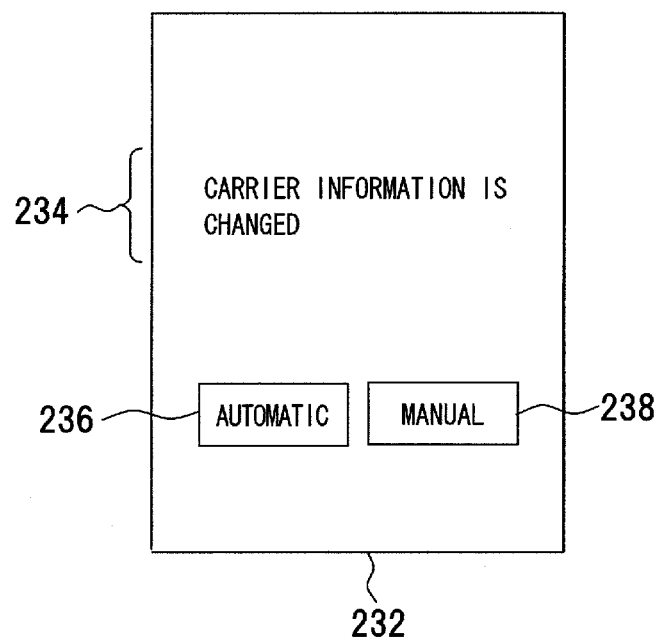
FIG. 11 depicts a dialog display screen.

Concerning change of an automatic or a manual, for example, as shown in FIG. 11, it may be configured that a dialog display screen 232 is displayed on the display 122, on the dialog display screen 232, a message 234 that carrier information is changed and buttons 236 and 238 for determining an automatic or a manual are displayed, then from selection thereof, an automatic or a manual change is set.

Figure 12:
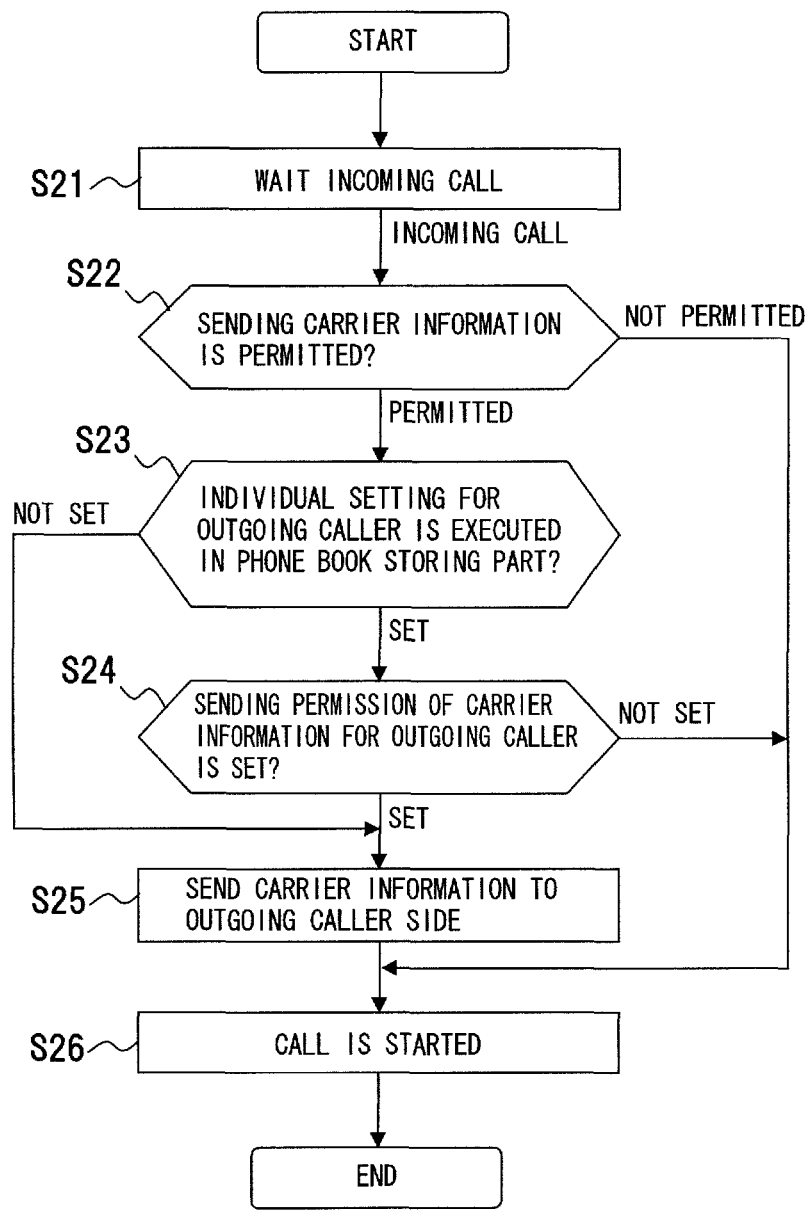
FIG. 12 is a flowchart showing processing procedure of a mobile telephone device at a receiving side.

A process of the mobile telephone device 62 at a receiving side of the call control system 21 will be described with reference to FIG. 12. FIG. 12 is a flowchart showing processing procedure of the mobile telephone device 62 at a receiving side.

In the mobile telephone device 62 at the receiving side, an incoming call is waited (step S21). If an incoming call arrives, it is confirmed whether sending carrier information is permitted (step S22). If the sending is permitted, it is confirmed whether an individual setting for the other end of the line (an outgoing caller) is executed in the phone book storing part 106 (step S23). If the setting is done, it is confirmed whether sending permission setting of carrier information for the outgoing caller is set (step S24). If the sending permission is set, carrier information is sent to the mobile telephone device 61 that is the outgoing caller side (step S25), and a call is started (step S26).

In step S22, if sending carrier information is not permitted, or in step S24, if there is no sending permission setting of carrier information for the outgoing caller, a call is started (step S26). In step S23, if an individual setting of an outgoing call permission for the outgoing caller is not set, the process moves to step S25, carrier information is sent (step S25) and a call is started.

Figure 13:
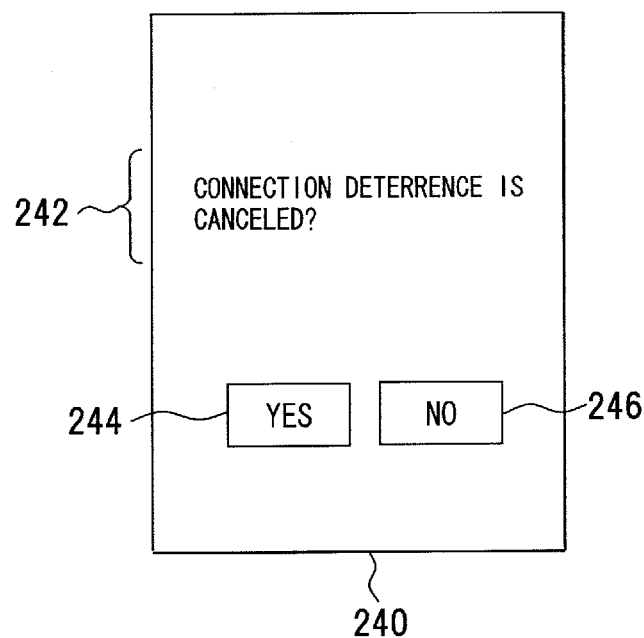
FIG. 13 depicts a dialog display screen.

For a normal call, if inconsistency of carrier information causes outgoing call restriction or call deterrence, a call function is prevented when an emergency call. Therefore, it may be configured that after display of carrier information, a dialog display screen 240 is displayed on the display 122 as shown in FIG. 13, for example in case of a call outgoing in a predetermined procedure, a message 242 of cancelling connection deterrence is displayed on the dialog display screen 240, buttons 244 and 246 for determining whether to cancel or not are displayed, and by selection of these responses (YES and NO), outgoing call restriction by a carrier of the other end of the line is canceled then a start of a call is preceded.

As described above, the processing contents are summarized as follows.

(1) A user sets carrier information of a connection destination in the carrier information storing part 118 in response to registration of a name, a telephone number, etc. of the other end of the line in the phone book storing part 106 of the mobile telephone devices 61, 62, etc.

(2) In a connection with the mobile telephone devices 61 and 62, in an outgoing call, carrier information sent from the mobile telephone device 62 is transferred to the mobile telephone device 61 at an outgoing call side by the medium of the mobile telephone communication network 41.

(3) At the mobile telephone device 61 side, carrier information sent from the mobile telephone device 62 is displayed on the display 122. The sent carrier information is compared with carrier information of a connection destination stored in the carrier information storing part 118 at the mobile telephone device 61 side. If carrier information is different, an alarm is given at a start of a call, and it is notified that the carrier information is different.

(4) At an end of a call, input carrier information can be reflected automatically for utilizing next communication by updating registration information in the carrier information storing part 118 or, newly registering information and so on, from carrier information notified from the other end of the line. Thus, a user needs not to set manually and the latest carrier information can be maintained.

(5) If an incoming call side does not want to inform carrier information to an outgoing caller side, carrier information can be kept secret. This setting may be configured that notification permission or notification rejection is set toward a specific the other end of the line, a group, or all of them that are stored in the phone book storing part 106. In this case, it may be configured that about carrier information, setting information is held at the mobile telephone communication network 41 by using a browser and so on and notification deterrence of carrier information to an outgoing caller is executed at the mobile telephone communication network 41 side.

Second Embodiment

Figure 14:
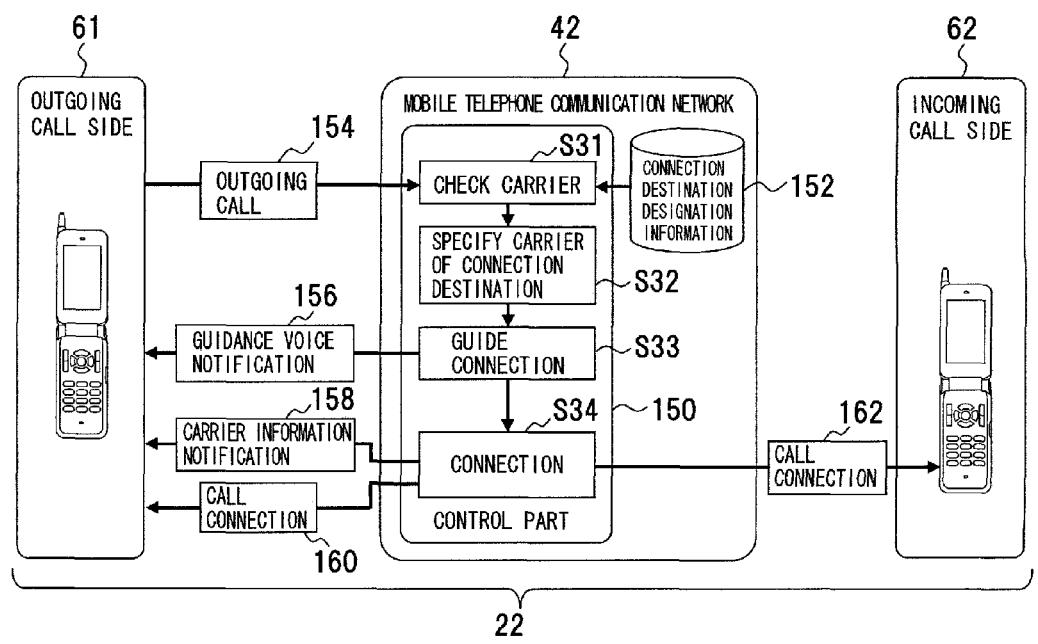
FIG. 14 depicts a call control system and an example of processing contents according to a second embodiment.

A second embodiment of the present invention will be described with reference to FIG. 14. FIG. 14 depicts a call control system and an example of processing contents according to the second embodiment.

In a call control system 22 of this embodiment, about mobile telephone devices 61 and 62 which use a mobile telephone communication network 42 as a communication server apparatus, it is executed that notification of carrier information of the other end of the line from the mobile telephone communication network 42 and/or control of connection deterrence. In the call control system 22, since the mobile telephone devices 61 and 62 shown in FIGS. 2 and 3 are used and structure thereof is as described above, the explanation is omitted.

In the call control system 22, a database 152 is installed along with a control part 150 in the mobile telephone communication network 42. The control part 150 is configured by a computer. Specific connection destination designation information is stored in the database 152. The specific connection destination designation is, for example, that the mobile telephone device 61 subscribes to a station-to-station discount service and so on. Thus, in the mobile telephone communication network 42, when an outgoing call 154 is received from the mobile telephone device 61, the database 152 is retrieved as to an outgoing caller and it is retrieved whether the mobile telephone device 61, which is an outgoing caller, is registered as a specific connection destination or not.

If the mobile telephone device 61 is registered as a specific connection destination, a carrier is checked by referring to the database 152 (step S31) and it is specified which carrier the mobile telephone device 62 of the connection destination belongs to (step S32). If a specified carrier is not a carrier for receiving a specific service, connection guidance is sent from the mobile telephone communication network 42 to the mobile telephone device 61 (step S33). The mobile telephone device 61 receives guidance voice notification 156 from the mobile telephone communication network 42.

In the mobile telephone device 61, for starting a connection after confirmation of the guidance voice notification 156 or by skipping the guidance voice, the connection start key 142 (FIG. 3) of the operation input part 126 (FIG. 2) of the mobile telephone device 61 is pressed. From this, the mobile telephone device 61 starts a connection with the mobile telephone device 62 at an incoming call side via the mobile telephone communication network 42 (step S34) so carrier information notification 158 of the mobile telephone device 62 of a call connection destination is sent from the mobile telephone communication network 42 and call connections 160 and 162 are established between the mobile telephone devices 61 and 62. After the start of the call, carrier information of a connection destination is displayed on a screen of a display 122 of the mobile telephone device 61 based on the carrier information notification 158 notified from the mobile telephone communication network 42 (FIG. 9).

In this case, for example, in case of a carrier out of the station-to-station discount service as a result of retrieval, it may be configured that voice guidance for this call to be out of a discount service is published to an outgoing caller. As selection designation of carrier condition, whether the domestic or the foreign may be selection condition or call deterrence and so on can be executed with condition of a foreign roaming call.

After a call is ended, carrier information of a connection destination can be reflected in the phone book storing part 106 automatically. From this, there is no need to set manually individually and keeping the latest state automatically can be done. An automatic or a manual change can be designated by setting.

In the second embodiment, for a normal call, if inconsistency of carrier information causes outgoing call restriction or call deterrence, a call function is prevented when an emergency call. In case of a call outgoing in predetermined procedure, it may be configured that outgoing call restriction by a carrier of the other end of the line is canceled then a start of a call is preceded.

In the second embodiment, if carrier information is not wanted to be informed to an outgoing caller side, carrier information can be kept secret. This setting may be configured that notification permission or notification rejection is set toward a specific the other end of the line, a group, or all of them that are stored in the phone book storing part 106. In this case, it may be configured that about carrier information, setting information is held at the mobile telephone communication network 42 side by using a browser and so on and notification deterrence of carrier information to an outgoing caller is executed at the mobile telephone communication network 42 side.

Third Embodiment

Figure 15:
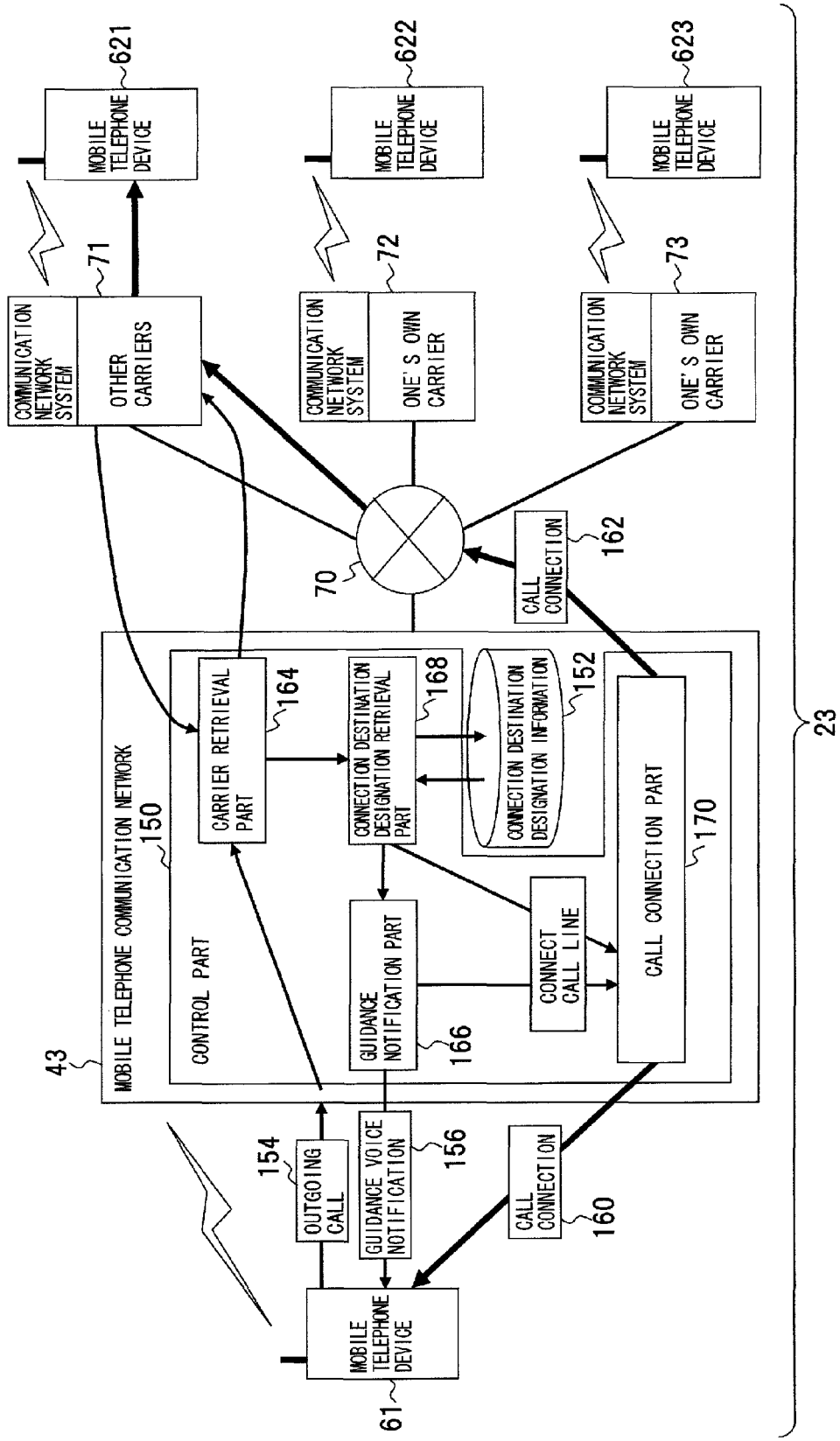
FIG. 15 depicts a call control system according to a third embodiment.

A third embodiment of the present invention will be described with reference to FIG. 15. FIG. 15 depicts a call control system according to a third embodiment. Same reference numerals are used in FIG. 15 for the same constituents in FIG. 14.

In this call control system 23, a plurality of mobile telephone devices 621, 622 and 623 are assumed as a call destination of a different carrier for a mobile telephone device 61. Between the mobile telephone device 61 and the mobile telephone devices 621-623, a mobile telephone communication network 43 and a line exchanger 70 are provided as a communication server apparatus, and communication network systems 71, 72 and 73 are provided for every carrier to which the mobile telephone devices 621-623 subscribe. Here, as to "other carriers" and "one's own carrier", a carrier which is the same as a carrier to which the mobile telephone device 61 subscribes is called one's own carrier, and a carrier which is different from that is called other carriers.

The mobile telephone communication network 43 is provided with a control part 150 as well as the mobile telephone communication network 42 of the second embodiment. For the control part 150, a carrier retrieval part 164, a guidance notification part 166, a connection destination designation retrieval part 168 and a call connection part 170 are provided. The call connection part 170 comprises call deterrence part because of including a call deterrence function.

In the mobile telephone communication network 43, an outgoing call 154 is received from the mobile telephone device 61 and a carrier is retrieved in the carrier retrieval part 164. The connection destination designation retrieval part 168 accesses the database 152, and connection destination designation information is retrieved. A result thereof is notified to the guidance notification part 166. If the retrieved carrier is a carrier out of contract, guidance voice notification 156 indicating that effect is transmitted to the mobile telephone device 61. If there is no request for connection deterrence from the mobile telephone device 61 or the mobile telephone device 61 is a connection designation destination, connection permission is sent to the call connection part 170, then call connections 160 and 162 between the mobile telephone device 61 and, in this case, the mobile telephone device 621 are established. Other structure is the same as the second embodiment, and description thereof is omitted.

Fourth Embodiment

Figure 16:
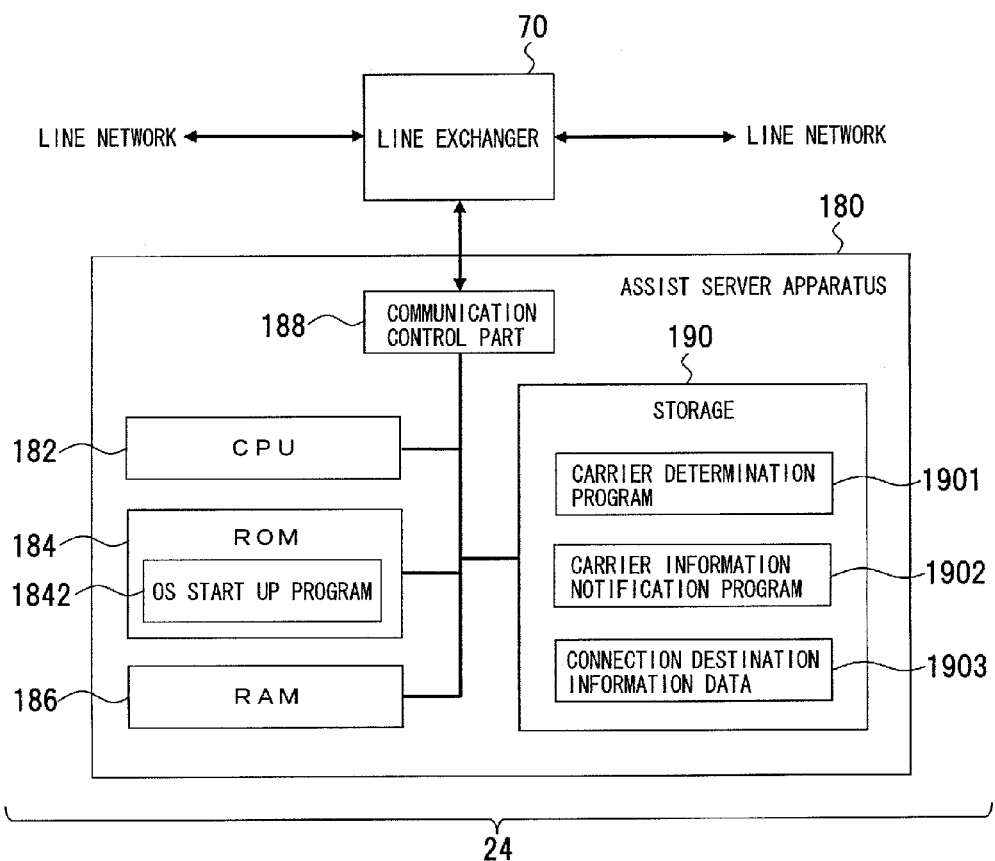
FIG. 16 depicts a call control system according to a fourth embodiment.

A fourth embodiment of the present invention will be described with reference to FIG. 16. FIG. 16 depicts a call control system according to the fourth embodiment. Same reference numerals are used in FIG. 16 for the same constituents in FIG. 15.

In a call control system 24, a line exchanger 70 and an assist server apparatus 180 are disposed instead of the above described mobile telephone communication network 42 or the mobile telephone communication network 43. The assist server apparatus 180 is configured by a computer. In the embodiment, a CPU 182, a ROM 184, a RAM 186, a communication control part 188 and a storage 190 are provided. Since the communication control part 188 includes a call deterrence function, the communication control part 188 configures a call deterrence part.

The CPU 182 starts up an operating system (OS) stored in the storage 190 by an operating system (OS) start up program 1842 stored in the ROM 184 and executes various programs stored in the storage 190, then controls the communication control part 188 and so on. The RAM 186 is used for a working area. The communication control part 188 is controlled by the CPU 182 and switches the line exchanger 70.

Various programs and the above described OS are stored in the storage 190. For example, the storage 190 is configured by a hard disk device and stores a carrier determination program 1901, a carrier information notification program 1902 and a database 1903. Connection destination information such as carrier information of a connection destination is stored in the database 1903.

From such structure, by execution of the carrier determination program 1901, a carrier is determined, connection destination information stored in the database 1903 is accessed and if a carrier of a connection destination is different from that of an outgoing call side, it is notified by execution of the carrier information notification program 1902 that carrier information is different.

Other Embodiments

Figure 17:
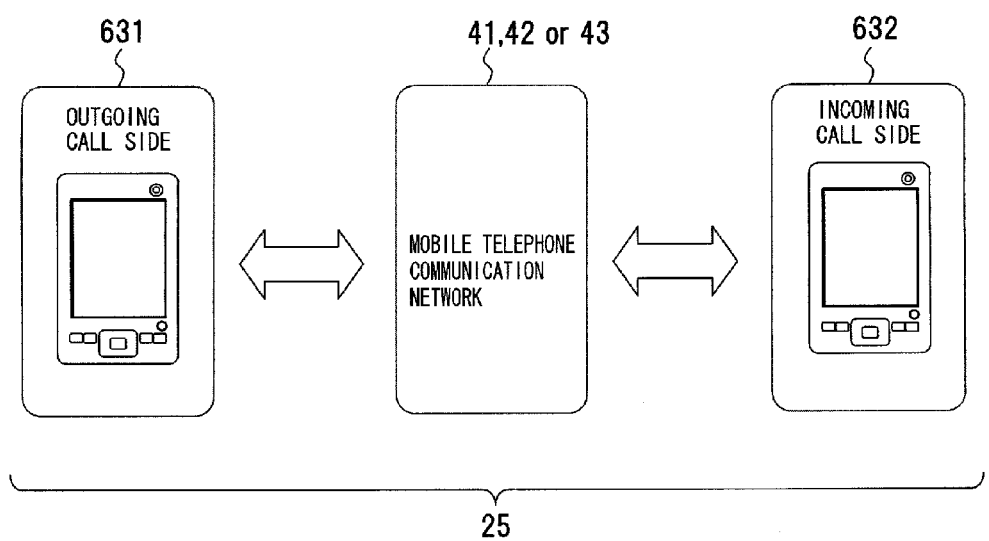
FIG. 17 depicts a call control system according to other embodiments.
Figure 18:
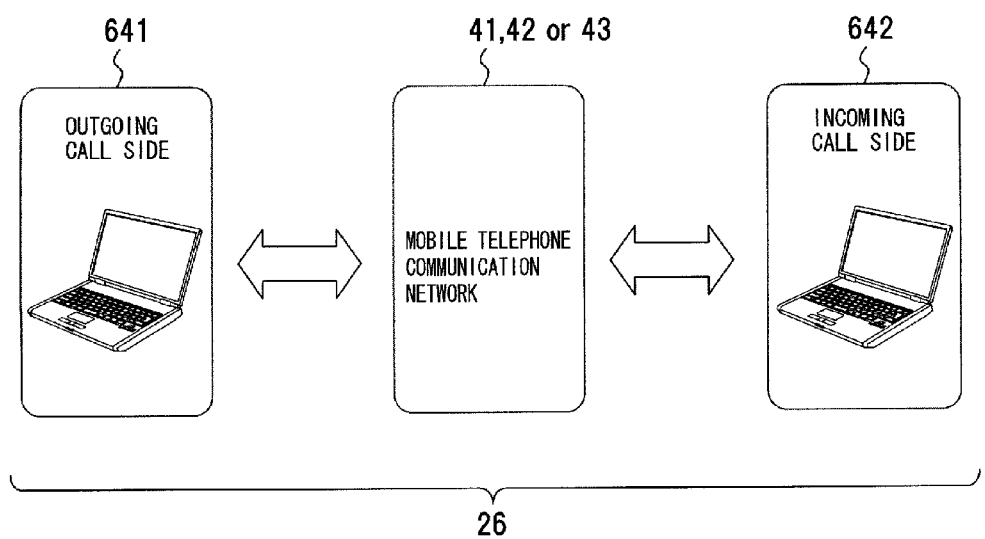
FIG. 18 depicts a call control system according to other embodiments.

In the above embodiment, the mobile telephone devices 61, 62, etc. are exemplified and described. The present invention can apply to a call control system 25 applied to call control between personal digital assistants (PDA) 631 and 632 as shown in FIG. 17, for example, and a call control system 26 applied to call control between personal computers (PC) 641 and 642 as shown in FIG. 18. As the call control system, the present invention applies to a call connection between a mobile telephone device and a PDA, between a mobile telephone device and a PC and between a PDA and a PC, and is not limited by the structure of the above embodiments. In FIGS. 17 and 18, the same numerals are given to the same part as FIG. 1 or 14, and description thereof is omitted.

Other Inventive Matters

Technical ideas extracted from the above-mentioned embodiments are enumerated as follows.

(ADDITIONAL REMARK 1) A mobile telephone device comprising:

a storage part that stores carrier information of a call destination;

a determination part that determines in a call whether carrier information notified from the call destination coincides with carrier information which exists in the storage part; and a notification part that notifies the determination if the determination part determines that the carrier information notified from the call destination is different from the carrier information in the storage part.

(ADDITIONAL REMARK 2) The mobile telephone device of ADDITIONAL REMARK 1, wherein the notification part comprises a display part displaying the carrier information notified from the call destination.

(ADDITIONAL REMARK 3) The mobile telephone device of ADDITIONAL REMARK 1, comprising:

a call deterrence part that suppresses a call if the carrier information notified from the call destination is different from the carrier information in the storage part.

(ADDITIONAL REMARK 4) The mobile telephone device of ADDITIONAL REMARK 1, comprising:

a storing control part that writes the carrier information notified from the call destination into the storage part or updates the storage part by a connection with the call destination.

(ADDITIONAL REMARK 5) A mobile telephone device comprising:

a storage part that stores carrier information; and a notification part that notifies in a call the carrier information existing in the storage part to a call destination.

(ADDITIONAL REMARK 6) The mobile telephone device of ADDITIONAL REMARK 5, comprising:

a setting part that sets whether the carrier information is notified to the call destination, wherein the notification part notifies the carrier information or rejects notification of the carrier information by the setting of the setting part.

(ADDITIONAL REMARK 7) A communication server apparatus that is connected to a mobile telephone device, comprising:

a notification part that specifies a carrier of a receiving side designated by an outgoing call side and notifies carrier information of the receiving side to the outgoing call side.

(ADDITIONAL REMARK 8) The communication server apparatus of ADDITIONAL REMARK 7, comprising:

a connection part that connects the outgoing call side with the receiving side after the notification part notifies the carrier information.

(ADDITIONAL REMARK 9) A control method of a mobile telephone device comprising:

storing carrier information of a call destination in a storage part;

determining in a call whether carrier information notified from the call destination coincides with carrier information which exists in the storage part; and notifying the determination if it is determined that the carrier information notified from the call destination is different from the carrier information in the storage part.

(ADDITIONAL REMARK 10) The control method of a mobile telephone device of ADDITIONAL REMARK 9, comprising:

displaying the carrier information notified from the call destination on a display part.

(ADDITIONAL REMARK 11) The control method of a mobile telephone device of ADDITIONAL REMARK 9, comprising:

suppressing a call if the carrier information notified from the call destination is different from the carrier information in the storage part.

(ADDITIONAL REMARK 12) The control method of a mobile telephone device of ADDITIONAL REMARK 9, comprising:

writing the carrier information notified from the call destination into the storage part or updating the storage part by a connection with the call destination.

(ADDITIONAL REMARK 13) A control method of a mobile telephone device, comprising:

storing carrier information in a storage part; and notifying in a call the carrier information existing in the storage part to a call destination.

(ADDITIONAL REMARK 14) The control method of a mobile telephone device of ADDITIONAL REMARK 13, comprising:

setting whether the carrier information is notified to the call destination; and notifying the carrier information or rejecting notification of the carrier information by the setting.

(ADDITIONAL REMARK 15) A control method of a communication server apparatus connected to a mobile telephone device, the method comprising:

specifying a carrier of a receiving side designated by an outgoing call side and notifying carrier information of the receiving side to the outgoing call side.

(ADDITIONAL REMARK 16) The control method of a communication server apparatus of ADDITIONAL REMARK 15, comprising:

connecting the outgoing call side with the receiving side after notification of the carrier information.

(ADDITIONAL REMARK 17) A computer-readable recording medium storing a control program of a mobile telephone device, the program comprising the steps of:

storing carrier information of a call destination in a storing part;

determining in a call whether carrier information notified from the call destination coincides with carrier information which exists in the storage part in a call; and notifying the determination if it is determined that the carrier information notified from the call destination is different from the carrier information in the storage part.

(ADDITIONAL REMARK 18) The recording medium of ADDITIONAL REMARK 17, the program comprising the step of:

displaying the carrier information notified from the call destination on a display part.

(ADDITIONAL REMARK 19) The recording medium of ADDITIONAL REMARK 17, the program comprising the step of:

suppressing a call if the carrier information notified from the call destination is different from the carrier information in the storage part.

(ADDITIONAL REMARK 20) The recording medium of ADDITIONAL REMARK 17, the program comprising the step of:

writing the carrier information notified from the call destination into the storage part or updating the storage part by a connection with the call destination.

(ADDITIONAL REMARK 21) A computer-readable recording medium storing a control program of a mobile telephone device, the program comprising the steps of:

storing carrier information in a storage part; and notifying in a call the carrier information existing in the storage part to a call destination.

(ADDITIONAL REMARK 22) The recording medium of ADDITIONAL REMARK 21, the program comprising the steps of:

setting whether the carrier information is notified to the call destination; and notifying the carrier information or rejecting notification of the carrier information by the setting.

(ADDITIONAL REMARK 23) A computer-readable recording medium storing a control program of a communication server apparatus connected to a mobile telephone device, the program comprising the step of:

specifying a carrier of a receiving side designated by an outgoing call side and notifying carrier information of the receiving side to the outgoing call side.

(ADDITIONAL REMARK 24) The recording medium of ADDITIONAL REMARK 23, the program comprising the step of:

connecting the outgoing call side with the receiving side after notification of the carrier information.

While the present invention has been described with the preferred embodiments, the description is not intended to limit the present invention. Various modifications of the embodiments based on the subject matters and objects described in claims or disclosed in this specification will be apparent to those skilled in the techniques, and such modifications rightfully fall within the true scope of the present invention.

The present invention relates to obtaining telephone line (carrier) information and to call control. By the present invention, carrier information of the other end of the line can be obtained and convenience of a call such as a call depending on a carrier can be enhanced. Thus the present invention has usability.

What is claimed is:

1. A mobile telephone device comprising:
a storage part that stores carrier information of each call destination, the carrier information being obtained before a call is made to a call destination and representing a communication line provided for the call destination;
a determination part that reads out the carrier information, which corresponds to the call destination, from the storage part, compares the carrier information read out from the storage part with carrier information, which is notified from the call destination in the call and which represents the communication line provided for the call destination, and determines in the call whether the carrier information, which is notified from the call destination, is different from the carrier information read out from the storage part;
a notification part that notifies that the carrier information is different when the determination part determines that the carrier information notified from the call destination is different from the carrier information read out from the storage part; and
a storing control part that updates the carrier information stored in the storage part to be the carrier information notified from the call destination when the carrier information notified from the call destination is different from the carrier information read out from the storage part.

2. The mobile telephone device of claim 1, wherein the notification part comprises a display part displaying the carrier information notified from the call destination.

3. The mobile telephone device of claim 1,
wherein the storing control part writes the carrier information notified from the call destination into the storage part by a connection with the call destination.

4. A mobile telephone device comprising:
a storage part that stores carrier information of each call destination, the carrier information being obtained before a call is made to a call destination and representing a communication line provided for the call destination;
a determination part that reads out the carrier information, which corresponds to the call destination, from the storage part, compares the carrier information read out from the storage part with carrier information, which is notified from the call destination in the call and which represents the communication line provided for the call destination, and determines in the call whether the carrier information, which is notified from the call destination, is different from the carrier information read out from the storage part;
a notification part that notifies that the carrier information is different when the determination part determines that the carrier information notified from the call destination is different from the carrier information read out from the storage part; and
a call deterrence part that suppresses a call when the carrier information notified from the call destination is different from the carrier information read out from the storage part.

5. A control method of a mobile telephone device, the control method comprising:
obtaining carrier information representing a communication line that is provided for a call destination before a call is made to the call destination, and storing the carrier information of each call destination in a storage part;
reading out the carrier information, which corresponds to the call destination, from the storage part, comparing the carrier information read out from the storage part with carrier information, which is notified from the call destination in the call and which represents the communication line provided for the call destination, and determining in the call whether the carrier information, which is notified from the call destination, is different from the carrier information read out from the storage part;
notifying that the carrier information is different when it is determined that the carrier information notified from the call destination is different from the carrier information read out from the storage part; and updating the carrier information stored in the storage part to be the carrier information notified from the call destination when the carrier information notified from the call destination is different from the carrier information read out from the storage part.

6. The control method of claim 5, further comprising:
displaying the carrier information notified from the call destination on a display part.

7. The control method of claim 5, further comprising:
writing the carrier information notified from the call destination into the storage part by a connection with the call destination.

8. A control method of a mobile telephone device, the control method comprising:

obtaining carrier information representing a communication line that is provided for a call destination before a call is made to the call destination, and storing the carrier information of each call destination in a storage part;

reading out the carrier information, which corresponds to the call destination, from the storage part, comparing the carrier information read out from the storage part with carrier information, which is notified from the call destination in the call and which represents the communication line provided for the call destination, and determining in the call whether the carrier information, which is notified from the call destination, is different from the carrier information read out from the storage part;

notifying that the carrier information is different when it is determined that the carrier information notified from the call destination is different from the carrier information read out from the storage part; and suppressing a call when the carrier information notified from the call destination is different from the carrier information read out from the storage part.

9. A non-transitory computer-readable medium having stored therein a program for causing a computer to execute a process of controlling a mobile telephone device, the process comprising:

obtaining carrier information representing a communication line that is provided for a call destination before a call is made to the call destination, and storing the carrier information of each call destination in a storing part;

reading out the carrier information, which corresponds to the call destination, from the storage part, comparing the carrier information read out from the storage part with carrier information, which is notified from the call destination in the call and which represents the communication line provided for the call destination, and determining in the call whether the carrier information, which is notified from the call destination, is different from the carrier information read out from the storage part;

notifying that the carrier information is different when it is determined that the carrier information notified from the call destination is different from the carrier information read out from the storage part; and updating the carrier information stored in the storage part to be the carrier information notified from the call destination when the carrier information notified from the call destination is different from the carrier information read out from the storage part.

10. The non-transitory computer-readable medium of claim 9, the process further comprising:
displaying the carrier information notified from the call destination on a display part.

11. The non-transitory computer-readable medium of claim 9, the process further comprising:
writing the carrier information notified from the call destination into the storage part by a connection with the call destination.

12. A non-transitory computer-readable medium having stored therein a program for causing a computer to execute a process of controlling a mobile telephone device, the process comprising:

obtaining carrier information representing a communication line that is provided for a call destination before a call is made to the call destination, and storing the carrier information of each call destination in a storing part;

reading out the carrier information, which corresponds to the call destination, from the storage part, comparing the carrier information read out from the storage part with carrier information, which is notified from the call destination in the call and which represents the communication line provided for the call destination, and determining in the call whether the carrier information, which is notified from the call destination, is different from the carrier information read out from the storage part;

notifying that the carrier information is different when it is determined that the carrier information notified from the call destination is different from the carrier information read out from the storage part; and suppressing a call when the carrier information notified from the call destination is different from the carrier information read out from the storage part.

\* \* \* \* \*